United States Patent
Hiscock et al.

(10) Patent No.: US 10,680,848 B2
(45) Date of Patent: Jun. 9, 2020

(54) MANAGING A NUMBER OF ETHERNET LINKS

(71) Applicant: HEWLETT PACKARD ENTERPRISE DEVELOPMENT LP, Houston, TX (US)

(72) Inventors: James S. Hiscock, Rockport, MA (US); David Law, Scotland (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 649 days.

(21) Appl. No.: 15/113,892

(22) PCT Filed: Jan. 29, 2014

(86) PCT No.: PCT/US2014/013684
§ 371 (c)(1),
(2) Date: Jul. 25, 2016

(87) PCT Pub. No.: WO2015/116071
PCT Pub. Date: Aug. 6, 2015

(65) Prior Publication Data
US 2016/0352535 A1    Dec. 1, 2016

(51) Int. Cl.
*H04L 12/24*     (2006.01)
*H04L 12/40*     (2006.01)
(Continued)

(52) U.S. Cl.
CPC ........ *H04L 12/40136* (2013.01); *H04L 5/003* (2013.01); *H04L 5/1438* (2013.01);
(Continued)

(58) Field of Classification Search
USPC ................................................ 709/220–224
See application file for complete search history.

(56) References Cited

U.S. PATENT DOCUMENTS

| 6,222,852 B1 | 4/2001 | Gandy |
| 6,904,110 B2 | 6/2005 | Trans et al. |

(Continued)

FOREIGN PATENT DOCUMENTS

| CN | 101060460 A | 10/2007 |
| EP | 2688243 A1 | 1/2014 |

OTHER PUBLICATIONS

"SYSTIMAX® Solutions to 10G and Beyond," Jun. 20, 2011, pp. 1-28, CommScope, Inc.

(Continued)

*Primary Examiner* — Younes Naji
*Assistant Examiner* — Da T Ton
(74) *Attorney, Agent, or Firm* — Park, Vaughan, Fleming & Dowler LLP

(57) ABSTRACT

A method for managing a number of Ethernet links includes identifying a number of Ethernet links to utilize a number of channels of a cable based on a number of capabilities and a number of policies of a number of media access controllers (MACs) and a number of physical layer entities (PHYs), determining a number of Ethernet link types to be configured for the cable based on the capabilities and policies of the MACs and PHYs, negotiating a number of parameters to allow multi-channel ports of a number of nodes connected to the cable to establish communications through the Ethernet links based on the determined Ethernet link types and the utilized channels, and managing the cable configuration describing the MACs to be supported by the channels within the cable based on the policies.

16 Claims, 9 Drawing Sheets

(51) Int. Cl.
    *H04L 12/935* (2013.01)
    *H04L 12/709* (2013.01)
    *H04L 29/06* (2006.01)
    *H04L 5/14* (2006.01)
    *H04L 5/00* (2006.01)
    *H04L 5/16* (2006.01)

(52) U.S. Cl.
    CPC ...... *H04L 41/0803* (2013.01); *H04L 41/0806* (2013.01); *H04L 41/0853* (2013.01); *H04L 45/245* (2013.01); *H04L 49/3054* (2013.01); *H04L 69/24* (2013.01); *H04L 5/1407* (2013.01); *H04L 5/16* (2013.01)

(56) References Cited

U.S. PATENT DOCUMENTS

| | | |
|---|---|---|
| 7,769,046 B1 | 8/2010 | Crocker |
| 8,461,848 B2 | 6/2013 | Breed et al. |
| 8,571,070 B2 | 10/2013 | Ghiasi et al. |
| 2006/0153307 A1 | 7/2006 | Brown et al. |
| 2007/0076658 A1 | 4/2007 | Park et al. |
| 2008/0089236 A1 | 4/2008 | Kotrla et al. |
| 2008/0304519 A1* | 12/2008 | Koenen ............ H04L 12/10 370/477 |
| 2010/0111081 A1* | 5/2010 | Diab ............... H04L 12/12 370/389 |
| 2012/0170591 A1 | 7/2012 | Diab et al. |
| 2012/0287856 A1 | 11/2012 | Ketchum et al. |
| 2013/0114623 A1 | 5/2013 | Diab et al. |
| 2013/0315080 A1* | 11/2013 | Diab ............... H04L 12/12 370/252 |
| 2014/0016637 A1* | 1/2014 | Masood ............ H04L 12/4013 370/390 |

OTHER PUBLICATIONS

International Search Report and Written Opinion, International Application No. PCT/US2014/013684, dated Sep. 25, 2014, pp. 1-11.

Mattias Nilsson, "Gigabit Ethernet over Category 5 Unshielded Twisted Pair Cable: Evaluating Electrical Characteristics of 1000BASE-T Physical Layer Devices," 2000, pp. 1-47.

International Preliminary Report on Patentability received for PCT Application No. PCT/US2014/013684, dated Aug. 11, 2016, 8 pages.

* cited by examiner

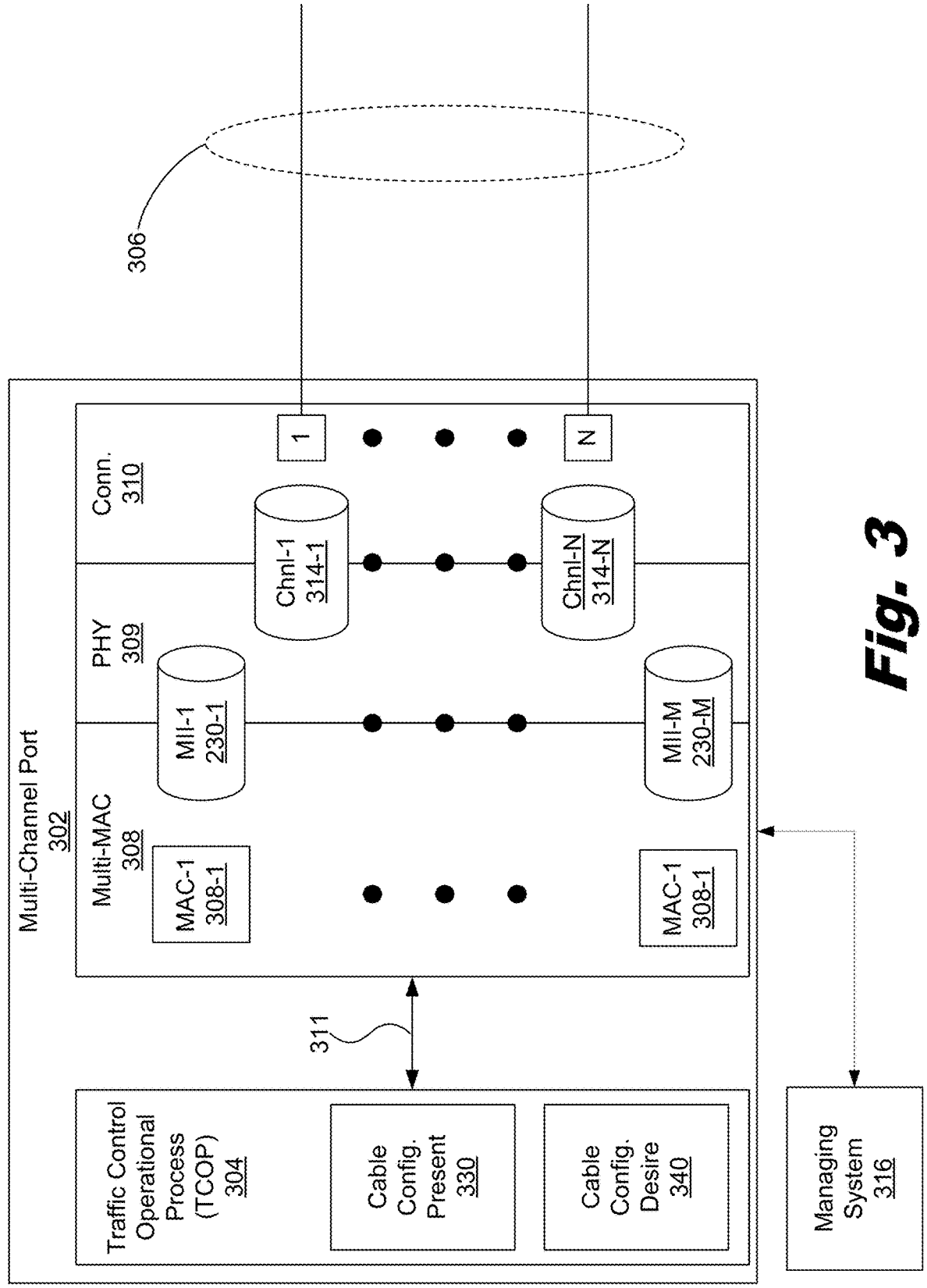

Fig. 8

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 801 | NP | Ack | MP | Ack2 | T | 0 | 0 | 0 | 0 | 0 | 0 | 0 | 0 | 0 | 1 | 1 |
| 802 | NP | Ack | MP | Ack2 | T | $O_{23}$ | $O_{22}$ | $O_{21}$ | $O_{20}$ | $O_{19}$ | $O_{18}$ | $O_{17}$ | $O_{16}$ | $O_{15}$ | $O_{14}$ | $O_{13}$ |
| 803 | NP | Ack | MP | Ack2 | T | $O_{12}$ | $O_{11}$ | $O_{10}$ | $O_9$ | $O_8$ | $O_7$ | $O_6$ | $O_5$ | $O_4$ | $O_3$ | $O_2$ |
| 804 | NP | Ack | MP | Ack2 | T | $O_1$ | $O_0$ | $U_{19}$ | $U_{18}$ | $U_{17}$ | $U_{16}$ | $U_{15}$ | $U_{14}$ | $U_{13}$ | $U_{12}$ | $U_{11}$ |
| 805 | NP | Ack | MP | Ack2 | T | $U_{10}$ | $U_9$ | $U_8$ | $U_7$ | $U_6$ | $U_5$ | $U_4$ | $U_3$ | $U_2$ | $U_1$ | $U_0$ |

800

US 10,680,848 B2

MANAGING A NUMBER OF ETHERNET LINKS

BACKGROUND

Ethernet links are used to connect devices to form a network to exchange data. Ethernet links are specified to operate over a number of transmission media such as co-ax cable, fiber optic cable, and twisted-pair cable. Ethernet links are also specified to operate at a number of data rates such as 10 megabits per second (Mb/s), 100 Mb/s, 1 gigabit per second (Gb/s), 10 Gb/s, 40 Gb/s, or 100 Gb/s, for example. A number of Ethernet physical layer entities (PHY) types are specified using various encodings to support the various transmission media, data rates, and distances. In the case of twisted-pair cable used for Ethernet links, the twisted pair cable comprises eight wires in the cable formed into four balanced twisted-pairs. In the case of fiber optic cable used for Ethernet links, there may be one, two or multiple of either single-mode or multi-mode fibers in the cable. The Institute of Electrical and Electronics Engineers (IEEE) 802.3 Ethernet standard defines a function termed "auto-negotiation" for passing configuration information from one PHY to another PHY on a link as part of the link start-up sequence. Auto-negotiation provide for the PHYs at the ends of an Ethernet link to exchange their abilities and then commence operation at their highest common operating ability. Auto-negotiation is specified for operation on twisted-pair as well as certain fiber optic links.

BRIEF DESCRIPTION OF THE DRAWINGS

The accompanying drawings illustrate various examples of the principles described herein and are a part of the specification. The examples do not limit the scope of the claims.

FIG. 3 is a diagram of a multi-channel port connected to a cable, according to one example of principles described herein.

FIG. 8 is a diagram of an organizationally unique identifier (OUI) next page message, according to one example of principles described herein.

Throughout the drawings, identical reference numbers designate similar, but not necessarily identical, elements.

DETAILED DESCRIPTION

Figure 1:
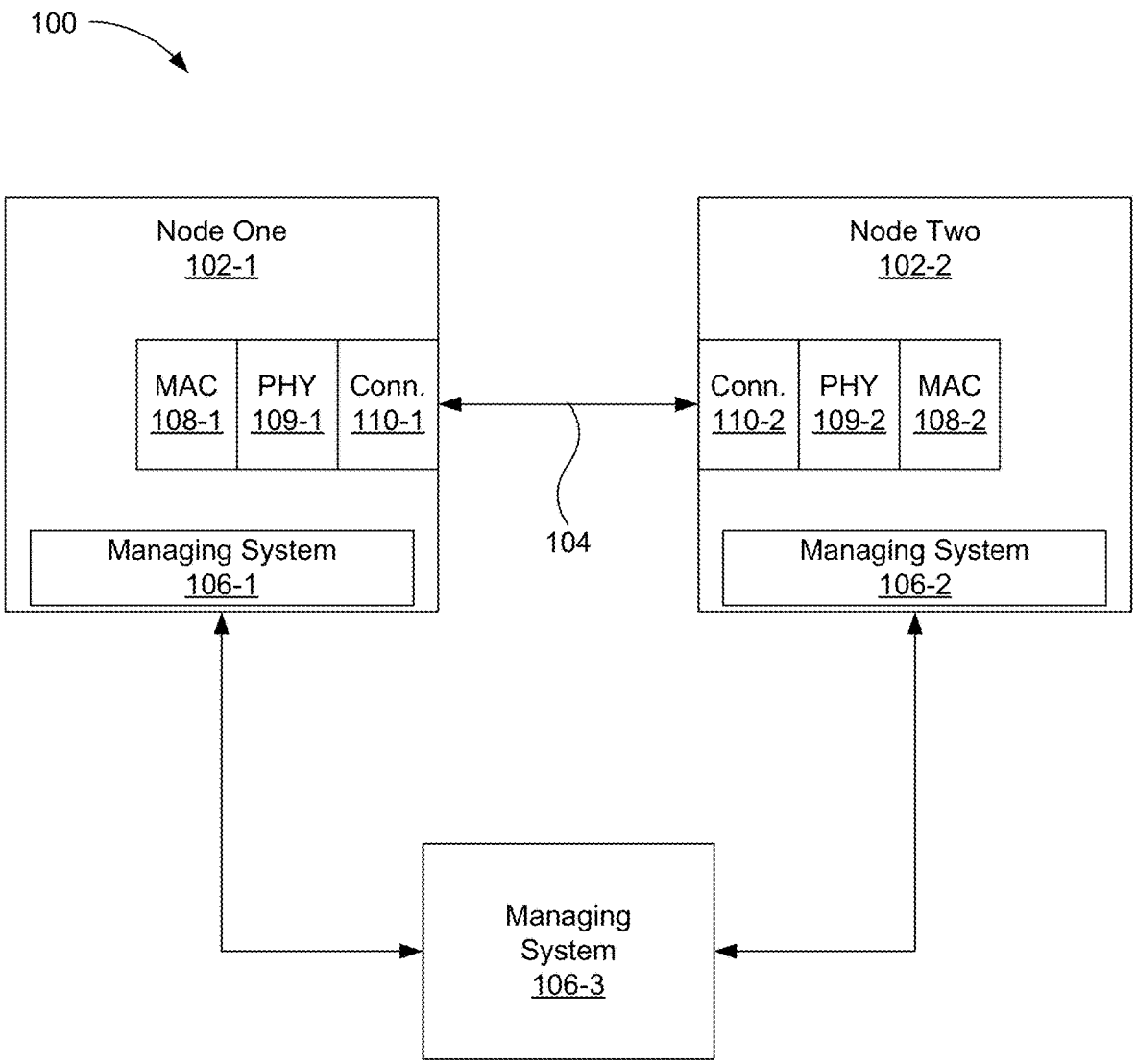
FIG. 1 is a diagram of a system for managing multiple Ethernet links on a cable, according to one example of principles described herein.

As mentioned above, Ethernet links are specified to operate over a number of transmission media, such as co-ax cable, fiber optic cable and twisted-pair cable, and at a number of data rates such as 10 Mb/s, 100 Mb/s, 1 Gb/s, 10 Gb/s, 40 Gb/s, or 100 Gb/s. Certain families of Ethernet PHY types, that support multiple data rates over the same transmission medium, provide a function to resolve to a highest common denominator Ethernet PHY type at link initialization based on advertised Ethernet PHY type data rate, and other capabilities, of the two devices on the Ethernet link. This function is termed auto-negotiation. One such family of Ethernet PHY types is the 10BASE-T, 100BASE-T, 1000BASE-T, 10GBASE-T family supporting operation at data rates of 10 Mb/s, 100 Mb/s, 1000 Mb/s and 10 Gb/s respectively over a twisted-pair medium. Another such family of Ethernet PHY types is the 1000BASE-X family supporting operation at 1000 Mb/s over a fiber optic medium. At link initialization, auto-negotiation occurs using a modified form of 10BASE-T link pulse signaling over two out of, for example, a total of four twisted-pairs of the twisted-pair cable. Once complete, and the highest common denominator Ethernet PHY type has been selected, data may be exchanged over the Ethernet link using two or more of the twisted-pairs of the twisted-pair cable, dependent on the Ethernet PHY type selected.

Once the link is initialized, and auto-negotiation is complete, the data rate at which data is exchanged remains constant, until the link is terminated. For example, if the data rate selected is 10 Gb/s, the data rate remains at 10 Gb/s until the communication link is terminated. Running a communication link at a 10 Gb/s link speed, when the communication link could be reduced to a 100 Mb/s link speed and still meet traffic demands, may not be energy efficient.

The principles described herein include a method for managing multiple Ethernet links on a single cable and multiple Ethernet links across multiple cables. Such a method includes identifying when the a single cable may be used to support multiple Ethernet links based on the capabilities of the devices connected; determining the number of Ethernet links that should operate based on the capabilities and policies of the devices connected; negotiating parameters to allow one or multiple Ethernet links to operate over the cable, whether the cable contains copper or fiber, based on the capabilities and policies of the devices connected; and managing, in real-time, the multiple Ethernet links in the cable based on a number of policies. Such a method allows multiple Ethernet links to use a single cable such that the Ethernet links may be powered on or off in real-time. As a result, communication through the cable may be more energy efficient while maintaining a traffic demand.

Further, the method may include determining the length of the cable to determine the allocation of the number of the multiple Ethernet links and their data rates to allow communications over the cable. Determining the length of the cable will be described in more detail below.

In the present specification and in the appended claims, the term "Ethernet link" is meant to be understood broadly as an act of allowing media access controllers (MACs) to establish a separate link including MAC and PHY functions, to enable to exchange of data over the cable. In one example, an Ethernet link may provide a link between nodes directly utilizing a number of channels in a cable. In another example, an Ethernet link may provide a link between nodes utilizing a single channel in a cable In the present specification and in the appended claims, the term "node" is meant to be understood broadly as a device that exchanges data over a cable. In one example, a node may include user devices such as laptops, desktops, servers, other user computing devices, or combinations thereof. In another example, nodes may include switches, routers, access points, gateways, or other network interconnecting devices, or combinations thereof. Further, the first end of the cable may be connected to a first node and the second end of the cable may be connected to a second node. In one example, the first end of the cable may be connected to a MAC of a first node, via the connector and PHY, and the second end of the cable may be connected to a MAC, via a connector and PHY, of a second node. A cable may have multiple channels in it, and, therefore, with multiple channels the cable can support one of more Ethernet links depending on the characteristics of the channel and the operating speed of the link. In this example, the MACs may be multi-MACs described herein.

In the present specification and in the appended claims, the term "channel" is meant to be understood broadly as a logical connection over a medium. A channel is used to convey an information signal, for example, a digital bit stream at the PHY level, from one node to another node. As an example, in the context of Ethernet communications, a channel may be a pair of wires, formed into a balanced twisted-pair (TP), in a cable containing copper wires, to allow nodes to exchange data. In another example, a channel may be a wavelength of light (lambda) on a fiber within a cable. In one example, a twisted-pair cable includes four twisted-pairs, and a single Ethernet link may utilize one, two, or four twisted-pairs in the cable in either simplex or duplex mode to allow nodes to exchange data over the cable. As a result, the nodes may exchange data over a cable on up to four channels in a twisted-pair cable.

The up to four channels of a twisted-pair cable may be configured as a single Ethernet link or up to four separate Ethernet links. In another example, in the context of Ethernet when the cable contains fiber, a channel provides a bit stream by utilizing a wavelength in a set of a number of wavelengths sent along the fiber contained within a single cable. A single wavelength can be configured as a single Ethernet link or multiple wavelengths can be configured as a single Ethernet link. In one example, the cable may be configured, for both twisted-pair and fiber cables, to have a number of channels dedicated to bit streams in one direction, and others of a number of channels dedicated to bit streams in the other direction. In this example, bit streams in a first direction are dedicated to transmit from Node A's transmit to Node B's receive, and bit streams in a second direction are dedicated to transmit from Node B's transmit to Node A's receive.

Further, as used in the present specification and in the appended claims, the term "engine" is meant to be understood broadly as a number of hardware devices, or combination of a number of hardware devices and executable instructions used to bring about the functionality described herein. In an example of an engine comprising a hardware device, the hardware device may be, for example, a number of application specific integrated circuits (ASICs). In an example of an engine comprising hardware devices and executable instructions, the hardware device may be, for example, a number of processors, and the executable instructions may be stored in a data storage device and executed by the processors.

Still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of a system (100) for managing multiple Ethernet links on a cable, according to one example of principles described herein. As will be described below, a managing system identifies a cable configuration to utilize multiple channels of a cable based on capabilities of the network connections of nodes connected to the cable. Further, the managing system (106-1, 106-2, 106-3) located on node one (102-1), node two (102-2), as a separate third part managing system (106-3), or combinations thereof manages, in real-time, the channels within the cable based on a number of policies. Node one (102-1) and node two (102-2) are computing devices or network interconnecting devices that comprise, among other elements, a processor and memory in order to perform the functions described herein.

As illustrated in FIG. 1, the system (100) includes node one (102-1) and node two (102-2). In this example, node one (102-1) establishes a communication link to node two (102-2). As illustrated, the communication link may be made over a direct link (104). In keeping with the given example, the direct link (104) may be a cable and a number of the communication links are Ethernet links. The cable includes multiple channels to allow node one (102-1) to establish an Ethernet link with node two (102-2). Once the Ethernet link is established between node one (102-1) and node two (102-2), the nodes (102) may exchange data via the cable (104).

As illustrated in FIG. 1, the system (100) further includes a managing system (106). In one example, the managing system (106) identifies a cable configuration to utilize multiple channels of a cable based on capabilities of the network connections of the nodes connected to the cable (104). In this example, the managing system (106) identifies an Ethernet link for node one (102-1) and node two (102-2) via the channels within the cable (104).

The managing system (106) further determines a cable configuration for the cable based on the capabilities and policies of the network connections such as the MACs (108-1, 108-2) and PHYs (109-1, 109-2), of the nodes at both ends of the cable (104). As will be described in other parts of this specification, a configuration may be controlled by a central management or a port management managing system.

The managing system (106) negotiates parameters to allow the network connections of the nodes (102) to establish communications through the multiple channels created by utilization of a number of twisted pairs or through a number of wavelengths on the fiber of the cable, based on the capabilities and policies of the MACs (108-1, 108-2) and PHYs (109-1, 109-2) at both ends of the cable (104), which will determine what types can be supported. As will be described in later parts of this specification, the communication may be through one channel of the cable or up to four channels of the twisted-pair cable and through a number of wavelengths on a fiber for fiber optic cables.

The managing system (106) further manages, in real-time, the multiple available channels of the cable based on a number of policies. More information about the managing system (106) will be described in detail later on in this specification.

While this example has been described with reference to the managing system being located over the network, the managing system may be located in any appropriate location according to the principles described herein. For example, the managing system may be located in node one (102-1) as indicated by element 106-1, node two (102-2) as indicated by element 106-2, as a separate third part managing system as indicated by element 106-3 on a server, other locations, or combinations thereof.

As depicted in FIG. 1, node one (102-1) and node two (102-2) comprise media access controllers (MACs), elements 108-1 and 108-2, respectively; physical layer entities (PHYs) (109-1, 109-2); and connectors (110-1, 110-2) to join electrically or optically and physically the cable (104) to the respective nodes (102-1, 102-2). The MACs (108-1, 108-2) and PHYs (109-1, 109-2) provide for the exchange of data over the direct link (104), via connectors (110-1, 110-2). The MACs (108-1, 108-2) utilize media access control (MAC) data communication protocol which is a sub-layer of the data link layer, which itself is layer 2 of the Open Systems Interconnection (OSI) model. The MAC sub-layer provides addressing and channel access control mechanisms that make it possible for network nodes to communicate. In one example, the present systems and methods is full-duplex Ethernet is utilized in which point-to-point communication between two nodes is supported, and communications between more than two nodes is supported through the use of switches. The hardware that implements the MAC data communication protocol is the MACs (108-1, 108-2). In one example, the MACs (108-1, 108-2) of FIG. 1 may be multi-MACs as described below in connection with FIG. 3.

Further, as depicted in FIG. 1, node one (102-1) and node two (102-2) comprise Ethernet physical transceivers (PHY), elements 109-1 and 109-2, respectively. The PHYs (109-1, 109-2) are components that operate at the physical layer of the OSI network model. The PHYs (109-1, 109-2) implement the Ethernet physical layer portion of the standard, for example 1000BASE-SX, 1000BASE-T, 100BASE-TX, and 10BASE-T, and implements the hardware send and receive function of Ethernet frames specific for the media, data rates and distance. The PHYs (109-1, 109-2) further interface to the line modulation at one end and binary packet signaling at the other. Functions like MAC addressing are implemented by the MACs (108-1, 108-2).

Figure 2:
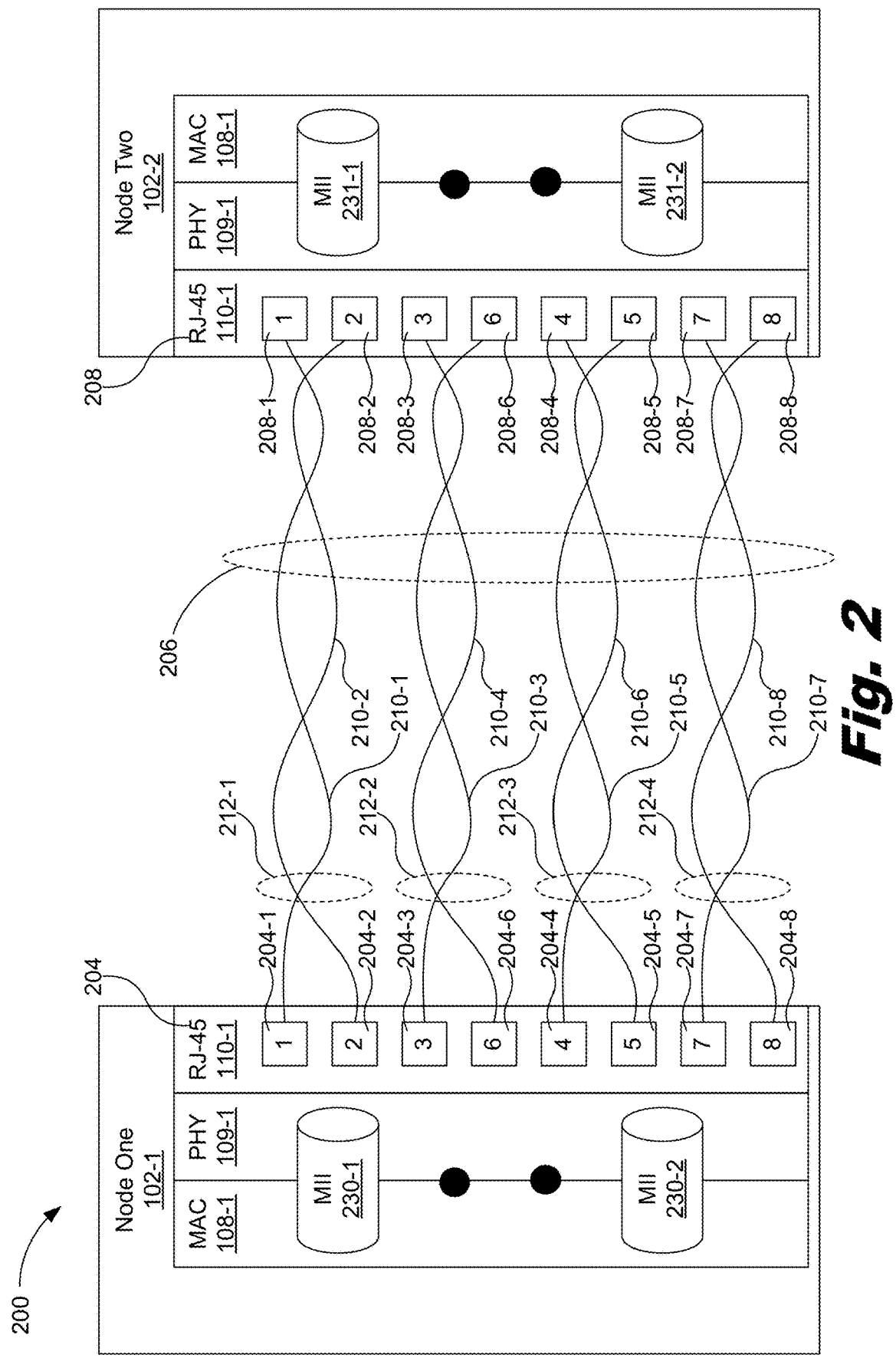
FIG. 2 is a diagram of a twisted-pair cable connected between two MACs via the PHY and connector of the two nodes depicted in FIG. 1, according to one example of principles described herein.

As depicted in FIG. 2, node one (102-1) and node two (102-2) comprise connectors, elements 110-1 and 110-2, respectively. In one example depicted in FIG. 2, the connectors (110-1, 110-2) are RJ-45 physical connectors for twisted-pair cable. In one example, the RJ-45 connectors (110-1, 110-2) are standardized as the IEC 60603-7 8P8C modular connector with different categories of performance, with all eight conductors present. The RJ-45 connectors (110-1, 110-2) are an 8 position 8 contact (8P8C) connector. An 8P8C connector is a modular connector used to terminate twisted-pair cable, and may be used for Ethernet links over twisted pair and other applications involving unshielded twisted pair, and shielded twisted pair. An 8P8C connector has two paired components: the male plug and the female jack, each with eight equally-spaced conducting channels. When an 8P8C plug is mated with an 8P8C jack, the contacts meet and create an electrical connection. Node one (102-1) and node two (102-2) communicate via the RJ-45 connectors (110-1, 110-2) and the cable (104). Thus, for a twisted-pair cable, the RJ-45 connectors (110-1, 110-2) connect the copper wires in the cable (104) to a number of etches on the circuit board of the node (102-1, 102-2).

Figure 2A:
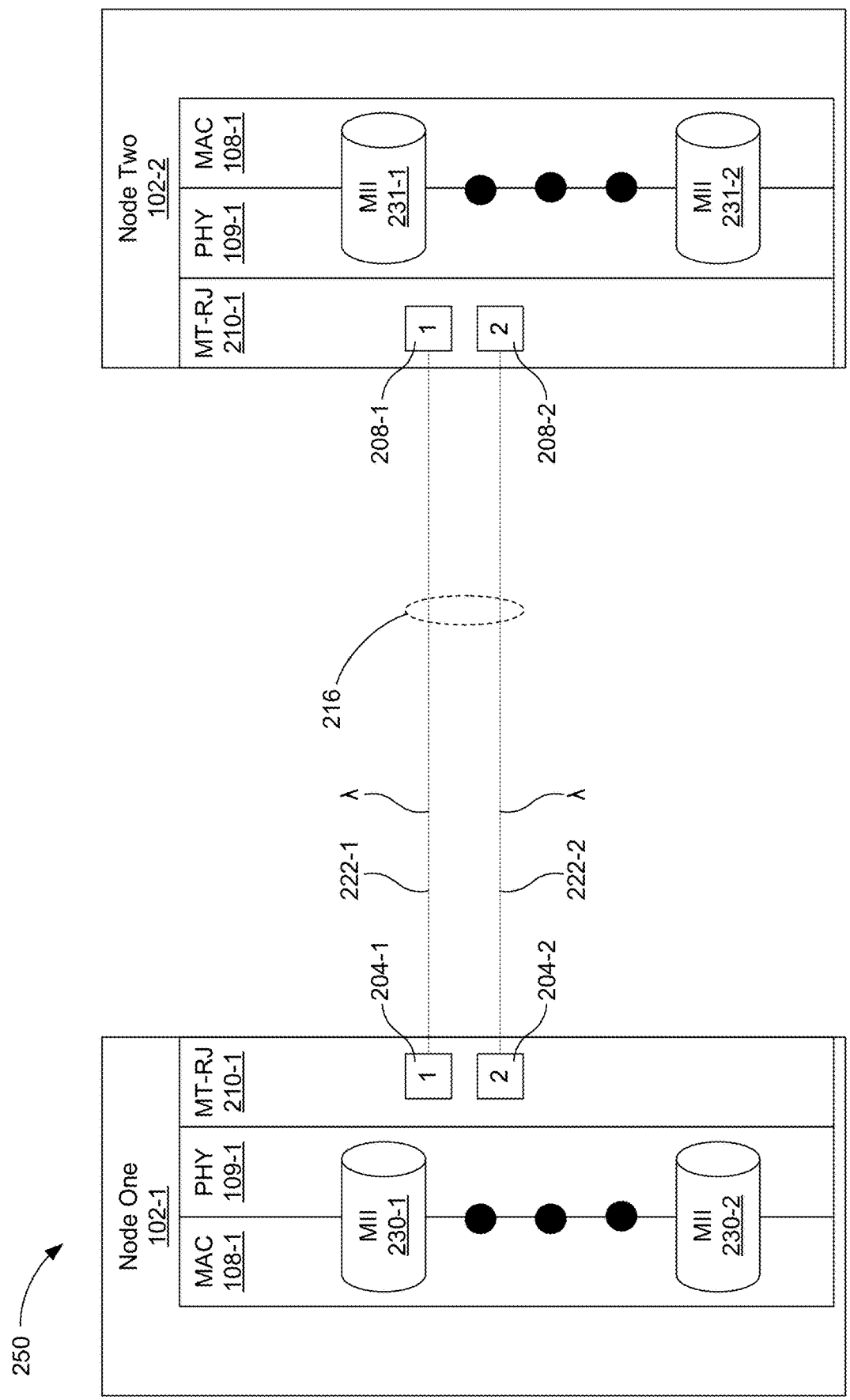
FIG. 2A is a diagram of a fiber cable connected between two MACs via the PHY and connector of the two nodes depicted in FIG. 1, according to another example of principles described herein.

In another example depicted in FIG. 2A, the connectors (210-1, 210-2) are mechanical transfer registered jack (MT-RJ) connectors (210-1, 210-2) for use in optical fiber Ethernet communications. In one example, the MT-RJ connectors (210-1, 210-2) are standardized as IEC 61754-18 duplex multimode connections. Thus, for a fiber cable (FIG. 2A, 216) the connectors (110-1, 110-2) tunnel the optical signal from the transmitter on the nodes (102-1, 102-2) into the cable (FIG. 2A, 216) and from the cable to a photo receiver on the nodes (102-1, 102-2).

The PHYs (109-1, 109-2) take the electrical or optical signals, and convert them to a Media Independent Interfaces (Mils) (230-1, 230-2, 231-1, 231-2) to interface with the MAC as specified in IEEE 802.3. In the example of FIG. 2, two Mils (230-1, 230-2, 231-1, 231-2) are depicted. Thus, in one example where the MACs (108-1, 108-2) of FIG. 2 are multi-MACs as described below in connection with FIG. 3, a plurality of Mils (230-1, 230-2, 231-1, 231-2) are present within the system. A MII (230-1, 230-2, 231-1, 231-2) is an interface specified by IEEE 802.3 Ethernet standard, and provides the interface between the MAC (108-1, 108-2) functions and the PHY (109-1, 109-2) functions. In the example of FIG. 2, the most channels possible for the copper twisted-pair cable (206) is four due to a limit of four twisted-pairs. Thus, although only two MIIs (230-1, 230-2, 231-1, 231-2) are depicted in FIG. 2, a total of four MIIs (230-1, 230-2, 231-1, 231-2) may be present and utilized as indicated by two dots between the MIIs (230-1, 230-2, 231-1, 231-2). In the example of FIG. 2A were a fiber optic cable (216) is used, there may exist, for example, 8, 16, 64, 128, or more lambdas ($\lambda$-1, $\lambda$-2), or any number of wavelengths that may reside on a number of fibers (222-1, 222-2) of a single cable (216), each providing a channel to be assigned its use. In this example, the three dots between the MIIs (230-1, 230-2, 231-1, 231-2) represent the many possible MIIs (230-1, 230-2, 231-1, 231-2).

Although mentioned above in some aspects, FIG. 2 is a diagram (200) of a twisted pair cable (206) connected between two MACs (108-1, 108-2) of the two nodes (102-1, 102-2) depicted in FIG. 1, according to one example of principles described herein. As mentioned above, the managing system (106-1, 106-2, 106-3) negotiates parameters to allow the nodes to establish communications through multiple channels of the cable based on the communication link type(s) selected. In one example, negotiation includes finding the best match of a set of parameters of each end of the cable. Further, the managing system manages, in real-time, utilizes the channels of the cable based on a number of policies.

As illustrated in FIG. 2, a twisted-pair cable (206) is used to establish a communication link between MAC (108-1) of node one (102-1) and MAC (108-2) of node two (102-2). In one example, a first end of the cable (206) is connected to the node one (102-1) utilizing, in this example, the RJ-45 connector (110-1), PHY (109-1), and MAC (108-1); and the second end of the cable (206) connected to node two (102-2) utilizing the RJ-45 connector (110-2), PHY (109-2), and MAC (108-2). In one example, the MACs (108-1, 108-2) of FIG. 2 may be multi-MACs as described below in connection with FIG. 3.

As mentioned above, a number of two wire pairs, called a twisted-pair (212), in a cable (206), are provided to allow nodes to exchange data. In one example, the cable (206) includes four twisted-pairs (212-1, 212-2, 212-3, 212-4) to allow the MACs (108) to exchange data over the cable (206).

In one example, the cable (206) may include a number of conductors (210). In one example, the conductors (210) are copper conductors. In one example, each twisted-pair (212-1, 212-2, 212-3, 212-4) comprises two conductors (210). As illustrated, twisted pair (212-1) comprising conductors 210-1 and 210-2 may be used as a first channel of the cable (206). Twisted-pair (212-2) comprising conductors 210-3 and 210-4 may be used as a second channel of the cable (206). Twisted-pair (212-3) comprising conductors 206-5 and 206-6 may be used as a third channel of the cable (206). Twisted-pair (212-4) comprising conductors 206-7 and 206-8 may be used as a fourth channel four of the cable (206). As a result, the MACs (108) may exchange data over the cable (206) on up to four channels per cable (206) by utilizing the twisted-pairs (212-1, 212-2, 212-3, 212-4). Further, the exchange of data may occur in simple or duplex mode. The twisted pairs (212-1, 212-2, 212-3, 212-4) will be collectively referred to herein as element (212). In one example, an Ethernet link may utilize two channels on two twisted-pairs in simplex mode, for example, 212-1 and 212-2. In yet another example, a single Ethernet link is configured that may utilize all four channels on twisted-pairs in duplex mode (212-1, 212-2, 212-3, 212-4). The initial selection is based on the best capabilities supported by both MACs (108-1, 108-2) and PHYs (109-1, 109-2) at each end of the cable (206).

As depicted in FIG. 2, each of the twisted pairs (212) may be connected to a number of pins (204) of the RJ-45 connector (110-1) and a number of pins (208) of RJ-45 connector (110-2). For example, pin (204-1) and pin (204-2) of RJ-45 connector (110-1) are connected to pin (208-1) and pin (208-2) of RJ-45 connector (110-2) via twisted pair (212-1) of the cable (206). Further, pin (204-3) and pin (204-6) of RJ-45 connector (110-1) are connected to pin (208-3) and (208-6) of RJ-45 connector (110-2) via twisted pair (212-2) of the cable (206). Further, pin (204-4) and pin (204-5) of RJ-45 connector (110-1) are connected to pin (208-4) and (208-5) of RJ-45 connector (110-2) via twisted pair (212-3) of the cable (206). Further, pin (204-7) and pin (204-8) of RJ-45 connector (110-1) are connected to pin (208-7) and pin (208-8) of RJ-45 connector (110-2) via twisted pairs (212-4) of the cable (206).

The MAC (108-1) is communicatively coupled to pins (204) via PHY (109-1), and MAC (108-2) is communicatively coupled to pins (208), via PHY (109-2). The communication interface between MAC (108) and the PHY (109) is via a Media Independent Interfaces (MII) (230-1, 230-2, 231-1, 231-2). The number of separate MIIs (230-1, 230-2, 231-1, 231-2) established is equal to the number of Ethernet links configured on the cable (206). In this example of a twisted-pair cable (206), one, two, three, or four separate Ethernet links can be configured which would result in one, two, three, or four MIIs (230-1, 230-2, 231-1, 231-2) established between the MAC (108) and PHYs (109).

As mentioned above, the managing system (106-1, 106-2, 106-3) manages, in real-time, the multiple twisted-pairs of the cable based on a number of policies. As illustrated, the cable (206) has up to four channels for which the twisted-pairs (212) are utilized. In one example, the communication may be through one channel of the cable or up to four channels of the cable.

For example, according to the policies, the communication may be through twisted-pair (212-1) of the cable. In keeping with the given example, the communication may be through twisted-pair (212-1) and twisted-pair (212-2) of the cable at a later time, according to the policies. In still the same example, the communication may be through twisted-pair (212-1), twisted-pair (212-2), twisted-pair (212-3), and twisted-pair (212-4) of the cable at an even later time, according to the policies. As a result, the multiple twisted-pairs (212) of the cable (206) may be utilized such that the multiple channels may be powered on or off in real-time according to the policies. Thus, communication through the multiple twisted-pairs (212) may be more energy efficient while maintaining a traffic demand. More information about managing, in real-time, the multiple twisted-pairs of the cable based on a number of policies will be described below.

FIG. 2A is a diagram (250) of a fiber cable (216) connected between two MACs (108-1, 108-2) via the PHYs (109-1, 109-2) and connectors (210-1, 210-2) of the two nodes depicted in FIG. 1, according to another example of principles described herein As illustrated in FIG. 2A, a fiber optic cable (216) is used to establish a communication link between MAC (108-1) of node one (102-1) and MAC (108-2) of node two (102-2). The fiber optic cable (216) may comprise a number of fibers (222-1, 222-2) that can support a number of wavelengths of light (lambdas (λ)), each providing a channel to be assigned its use. In the example of FIG. 2A, two fibers (222-1, 222-2) are depicted within the fiber optic cable (216). However, any number of fibers (222-1, 222-2) may be present and used within the fiber optic cable (216).

In one example, a first end of fiber optic cable (216) is connected to the node one (102-1) utilizing MT-RJ connector (210-1), PHY (109-1), and MAC (108-1), and a second end of fiber optic cable (216) is connected to node two (102-2) utilizing MT-RJ connector (210-2), PHY (109-2), and MAC (108-2).

Fiber optic cables can have various connector types, use different types of fibers (222-1, 222-2), and can carry a single wavelength (A) or multiple wavelengths of light. In one example of FIG. 2A, a pair of fibers and a single frequency may be used to provide the bit streams. In another example of FIG. 2A, a single fiber (222-1, 222-2) with multiple wavelengths (λ) may be used to provide the bit streams. In still another example of FIG. 2A, multiple wavelengths or either a single or pair of fibers (222-1, 222-2) may be used to create multiple channels coexisting on the fiber at different wavelengths (λ). As a result, the MACs (108) may exchange data over the fiber optic cable (216) on multiple channels (8, 16, 64, . . . ) per fibers (222-1, 222-2) of the fiber optic cable (216) by utilizing the multiple wavelengths (λ) to provide the multiple separate Ethernet links.

The MAC (108-1) is communicatively coupled to the MT-RJ connector (210-1) via PHY (109-1), and MAC (108-2) is communicatively coupled to the MT-RJ connector (210-2), via PHY (109-2). The communication interface between the MAC (108) and the PHY (109) is via the number of MIIs (230-1, 230-2, 231-1, 231-2). In the example of FIG. 2A, two MIIs (230-1, 230-2, 231-1, 231-2) are depicted. Thus, in one example where the MACs (108-1, 108-2) of FIG. 2A are multi-MACs as described below in connection with FIG. 3, a plurality of MIIs (230-1, 230-2, 231-1, 231-2) are present within the system. The number of separate MIIs (230-1, 230-2, 231-1, 231-2) established is equal to the number of Ethernet links configured on the cable (216). In this example of a fiber optic cable (216), one, two, eight, sixteen, sixty four, or more separate Ethernet links can be configured which would result in one, two, eight, sixteen, sixty four, or more MIIs (230-1, 230-2, 231-1, 231-2) established between the MAC (108) and PHYs (109).

FIG. 3 is a diagram of a multi-channel port (302) connected to a cable (306), according to one example of principles described herein. As mentioned above, the managing system (106-1, 106-2, 106-3) negotiates parameters to allow the nodes to establish communications through a number of channels, 1 to N, of the cable (306) based on the capabilities and policies of the MACs (108, 308) and PHYs (109, 309) at both ends to establish a number of cable configurations. Further, the managing system (106-1, 106-2, 106-3) manages, in real-time, the multiple twisted-pairs or wavelengths of light (λ) within the cable (306) based on a number of policies.

As illustrated, a multi-channel port (302) is connected to a cable (306). In one example, the multi-channel port (302) may be hardware used by a node (102-1, 102-2). Further, in this example, the cable (306) includes 1 to N channels (314-1 through 314-N) analogous to the twisted-pairs (212) of FIG. 2 and lambdas (λ) (222) of FIG. 2A. Further, the multi-channel port (302) has at least one transmit queue and at least one receive queue per active Ethernet link, and may also support multiple queues per channel for quality of service (QoS), separation, or other policy purposes for each Ethernet link. In one example, the managing system (316) provides the desired configuration information to the Traffic Control Operational Process (TCOP) (304) which controls the multi-MAC (308) to manage the four twisted-pairs (314) in real-time. The TCOP (304) is coupled to the multi-MAC (308) via, for example, an electrical connection (311). For example, the managing system (316) provides the desired configuration information to the TCOP (304) to transition an operational mode of the multi-MAC (308) from a current configuration state to a desired configuration state according to a number of policies. In one example, transition an operational mode of the multi-MAC (308) from a current configuration state to a desired configuration state may be accomplished through the use of a cable configuration-Desired module (Cable Config Desired) (340) and cable configuration-Present module (Cable Config Present) (330), as will be described in more detail below.

As illustrated, the multi-channel port (302) includes a Traffic Control Operational Process (TCOP) (304). The TCOP (304) is used to transfer packets of data to and from the receive and transmit queues. Further, the TCOP (304) controls the operational modes each of the one to N channels (314) of the cable (306). In one example, the operational modes may include allowing at least one of the N channels (314) to power on or off according to policies.

The multi-channel port (302) includes a multi-media access controller (Multi-MAC) (308). In one example, the TCOP (304) queues traffic to and from the multi-MAC (308) in a manner that adheres to a number of traffic policies. The TCOP (304) further instructs the multi-MAC (308) about usage of the N number of channels (314), the association of the N channels to the M number of MACs (308-1 through 308-M), and how to utilize each of the 1 to N channels (314-1 through 314-N) to support the 1 to M MACs (308-1 through 308-M) via the 1 to M MIIs (230-1 through 230-M). The TCOP (304) further instructs the multi-MAC (308) about how to transmit and receive data over one or more Ethernet links within the cable (306). The TCOP (304) comprises a cable configuration-Desired (Cable Config Desired) module (340) and cable configuration-Present (Cable Config Present) module (330). The Cable Config Desired (340) describes how the resources within the cable (306) should be configured, and the Cable Config Present (330) describes the present configuration of the resources within the cable (306). The cable configuration contains the number and type of MACs (308-1 through 308-M) configured, and how each of the MACs (308-1 through 308-M) utilize a number of channels (314-1 through 314-N) to communicate across the cable.

Further, the TCOP (304) instructs the multi-MAC (308) about the association of internal queues for at least one of the MACs (308-1 through 308-M). In one example, the multi-MAC (308) utilizes a number of the 1 to N channels (314-1 through 314-N) in a variety of ways. For example, the multi-MAC (308) utilizes twisted-pairs (212-1, 212-2, 212-3, 212-4) in the context of a copper twisted-pair cable (206) of FIG. 2 to run separate Ethernet links on each single twisted pair (212). In another example, the multi-MAC (308) utilizes all four-twisted pair channels (212-1, 212-2, 212-3, 212-4) for a single high speed communication Ethernet link. Further, the multi-MAC (308) may utilize any combination of single pair and/or multiple pair for each Ethernet link for data transfer across the copper twisted-pair cable (206). As a result, at least one of the N channels (314-1 through 314-N) of the cable (216) may be utilized such that at least one of the N channels (314-1 through 314-N) and associated MACs (308-1 through 308-M) may be powered on or off in real-time according to the policies via the multi-MAC (308). As a result, communication through the multiple channels may be more energy efficient while maintaining a traffic demand.

Figure 4:
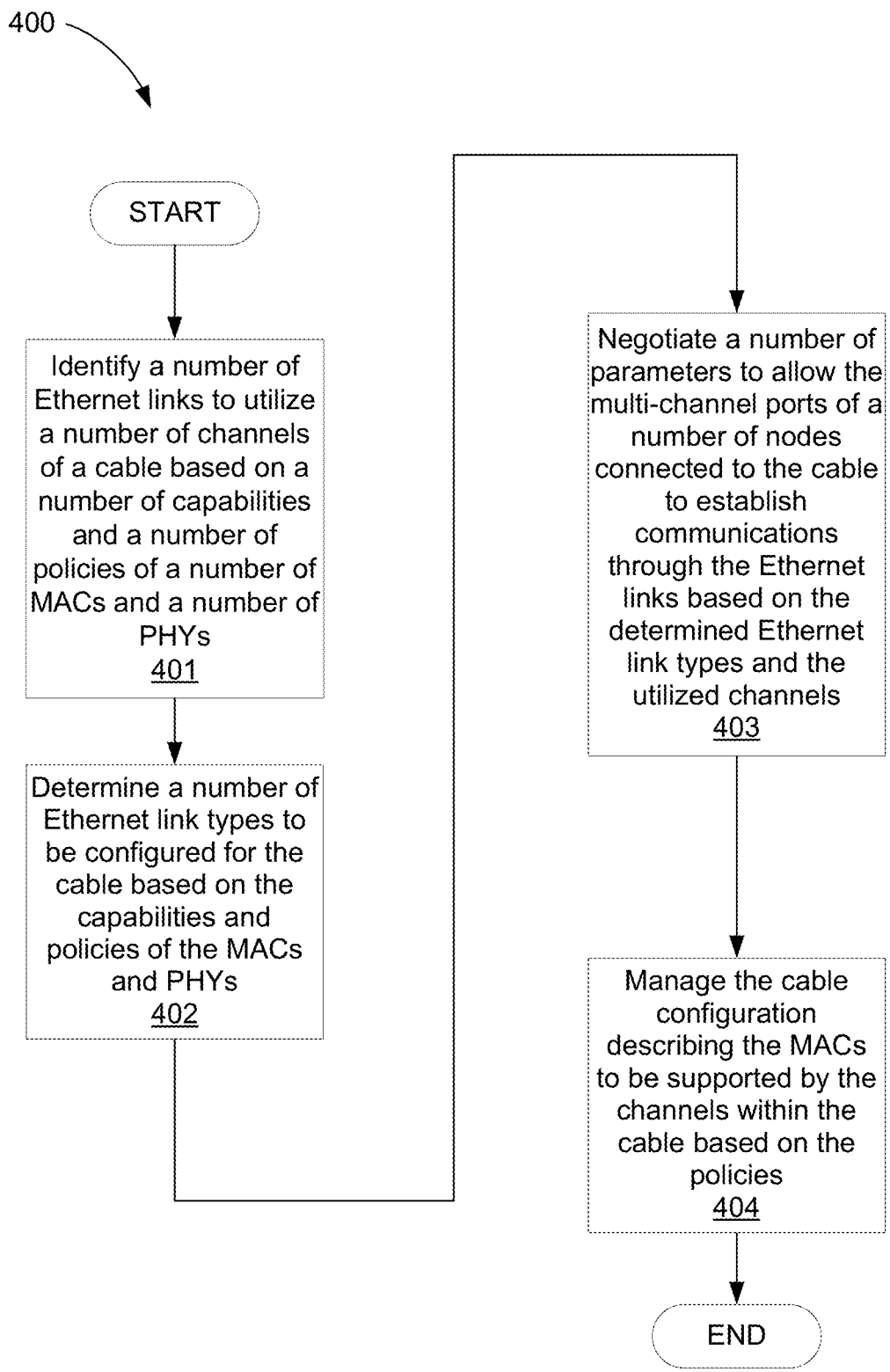
FIG. 4 is a flowchart of a method for managing multiple Ethernet links on a cable, according to one example of principles described herein.

FIG. 4 is a flowchart of a method for managing multiple Ethernet links on a cable (104, 206, 216, 306), according to one example of principles described herein. In one example, the method (400) may be executed by the system (300) of FIG. 3. In other examples, the method (400) may be executed by other systems described herein such as, for example, the system (100) of FIG. 1, the system (200) of FIG. 2, the system (250) of FIG. 2A, managing system (600) of FIG. 6 described below, memory resources (700) of FIG. 7 also described below, or combinations thereof.

In one example, the method (400) includes identifying (401) a number of Ethernet links to utilize a number of channels of a cable based on a number of capabilities and a number of policies of a number of MACs (108, 308) and a number of PHYs (109, 309) at both nodes (102-1, 102-2, 302) connected to the cable (104, 206, 216, 306). The method further includes determining (402) a number of Ethernet link types to be configured for the cable based on the capabilities and policies of the MACs and PHYs.

The method further includes negotiating (403) a number of parameters to allow the node's multi-channel ports to establish communications through a number of Ethernet links (1-M) utilizing a number of channels (1-N) across the cable based on the identified number of Ethernet link types and the utilization of a number of channels (1-N) that support the selected Ethernet link(s). In one example, the utilized channels are those channels recorded as a desired cable configuration. The method further includes managing (404), in real-time, the cable configuration describing a number of MACs (1-M) to be supported by a number of channels (1-N) within the cable based on a number of policies.

As mentioned above, the method (400) includes identifying (401) a number of Ethernet links to utilize a number of channels through a number of twisted-pairs (212-1, 212-2, 212-3, 212-4) or wavelengths (λ) of a cable (104, 206, 216, 306) based on a number of capabilities and a number of policies of the MACs (108, 308) at both nodes (102-1, 102-2, 302) connected to the cable (104, 206, 216, 306). In one example, the managing system (106, 316) identifies if one node (102-1, 102-2, 302) is connected to another node (102-1, 102-2, 302). If one node (102-1, 102-2, 302) is connected to another node (102-1, 102-2, 302), the method (400) identifies that a communication link is available. Alternatively, if one node (102-1, 102-2, 302) is not connected to another node (102-1, 102-2, 302), the method (400) identifies that a communication link is not available.

Further, depending on the nodes' (102-1, 102-2, 302) multi-channel port (302), multiple channels of the cable (104, 206, 216, 306) may be utilized to establish Ethernet link communications through the multiple channels. For example, if it is determined that the nodes (102-1, 102-2, 302) connected to a cable (104, 206, 216, 306) may utilize multiple twisted-pairs (212) or wavelengths (λ) of the cable (104, 206, 216, 306), the method (400) identifies a number of Ethernet links for the nodes as being able to utilize a number of channels (i.e., twisted-pairs (212) or wavelengths (λ)) of a cable (104, 206, 216, 306). Alternatively, if it is determined that the MACs (108, 308) of the nodes (102-1, 102-2, 302) connected to a cable (104, 206, 216, 306) cannot utilize a number of channels (i.e., twisted pairs (212) or wavelengths (λ)) of a cable, the method (400) does not identify a Ethernet link for the nodes as being able to utilize a number of channels (i.e., twisted pairs (212) or wavelengths (λ)) of the cable (104, 206, 216, 306), and, instead, uses a single channel.

Further, the managing system (106, 316) may utilize and extend the IEEE 802.3 Ethernet standard function termed "auto-negotiation" for passing configuration information from one PHY (109, 309) to the other on a link as part of the Ethernet link start-up sequence. Auto-negotiation provides for the PHYs (109-1, 109-2, 309-1, 309-2) at the ends of a cable (104, 206, 216, 306) to exchange their abilities and then commence operation at their highest common operating ability. Auto-negotiation is specified for operation on twisted-pair cable as well as certain fiber optic links described herein.

This standard function is extended to identify not just one, but rather a number of Ethernet links which utilize a number of channels within a cable based on MACs (108, 308) and PHYs (109, 309) of the nodes connected to the cable (104, 206, 216, 306). In one example, the auto-negotiation function is extended utilizing a 'next page' function that is defined in the IEEE standards. The next page function allows the transfer of arbitrary data between two devices on a link after the basic configuration information has been exchanged but prior to the link going into operation including exchange of addressed data packets. There are two types of auto-negotiation next page encoding. One type of auto-negotiation next page encoding is referred to as "message" pages, and another type of auto-negotiation next page encoding is referred to as "unformatted" pages. A next page message exchange includes the exchange of a message page and a number of unformatted pages. The message page defines the type of next page exchange taking place by the message code it contains. The number of unformatted pages that follow is determined by the particular next page message code.

Turning again to the figures, FIG. 8 is a diagram of an organizationally unique identifier (OUI) next page message (800), according to one example of principles described herein. The 48-Bit universal MAC address, used in Ethernet as the Ethernet MAC address comprises two parts. These parts are defined by the IEEE 802-2001 standard. The first 24 bits correspond to the Organizationally Unique Identifier (OUI) assigned by the IEEE. The second part, comprising the remaining 24, is administered locally by the assignee. When a device is manufactured, the OUI is combined with a 24 bit, locally administered value which is registered as used so it can never be used again. In this way a unique 48 bit MAC address is formed. As can be seen once $2^{24}$ (nearly 17 million) units are manufactured using a particular OUI the assignee has to return to the IEEE and request a new OUI.

The OUI Next Page message exchange allows the transfer of an OUI, and related user-defined user codes, from a far end device. The transfer of these user-defined user codes within the OUI Next Page message exchange can be used to determine the ability to operate multiple Ethernet links on a single cable, and on start-up, which of those multiple Ethernet links should operate. As the user-defined user codes are related to the OUI, that is, if the OUI is known to the receiving device, can the user-defined codes transferred be interpreted. This mechanism is not a multi-vendor approach. If, for example, another vendor's equipment were to receive an OUI Tagged Next Page message from a particular vendor, even if it was able to recognize the OUI as belonging to that particular vendor, it would be unable to decode it because format is defined by that particular vendor.

As illustrated in FIG. 8, an OUI Next Page message comprises a first code, identified as the "message code," followed by four subsequent codes, the first to fourth "user codes." The "header" of each code is five bits (NP, Ack, MP, Ack2 and T). Within FIG. 8, "NP" indicates whether or not this is the last next page to be transmitted as defined by the IEEE 802.3-2012, subclause 28.2.3.4.3 standards. "Ack" indicates that a device has successfully received its link partner's link code word as defined by the IEEE 802.3-2012, subclause 28.2.1.2.4 standards. "MP" means "message page" and differentiates a next page message page from a next page unformatted page as defined by the IEEE 802.3-2012, subclause 28.2.3.4.5 standards. "Ack2" indicates that a device has the ability to comply with the message as defined by the IEEE 802.32012, subclause 28.2.3.4.6 standards. "T" indicates a toggle bit used to ensure synchronization with the link partner during next page exchange as defined by the IEEE 802.3-1998, subclause 28.2.3.4.7 standards. Bits $O_{23\text{-}0}$ constitute the 24 bit organizationally unique identifiers as defined by the IEEE 802.3-2012, subclause 28C.6 standards. Bits $U_{19\text{-}0}$ are 20 bit user-defined user code values that is specific to the OUI transmitted as defined by the IEEE 802.3-2012 subclause 28C.6 standards.

Thus, the meanings of the five bits (NP, Ack, MP, Ack2 and T) are defined in the IEEE 802.3 standards. As indicated above, bits $O_{23}$ to $O_0$ constitute the 24 bit organizationally unique identifier (OUI). Hence, twenty bits ($U_{19}$-$U_1$) remain for the provision of user defined data associated with the OUI.

As illustrated in FIG. 8, an OUI next page message (800) comprises a first code (801), identified as the "message code" followed by four subsequent codes (802, 803, 804, 805) are first to fourth "user codes." The "header" of each code (801, 802, 803, 804, 805) comprises five bits (NP, Ack, MP, Ack2 and T), and their meaning is defined in the IEEE 802.3 standard as described above.

Figure 9:
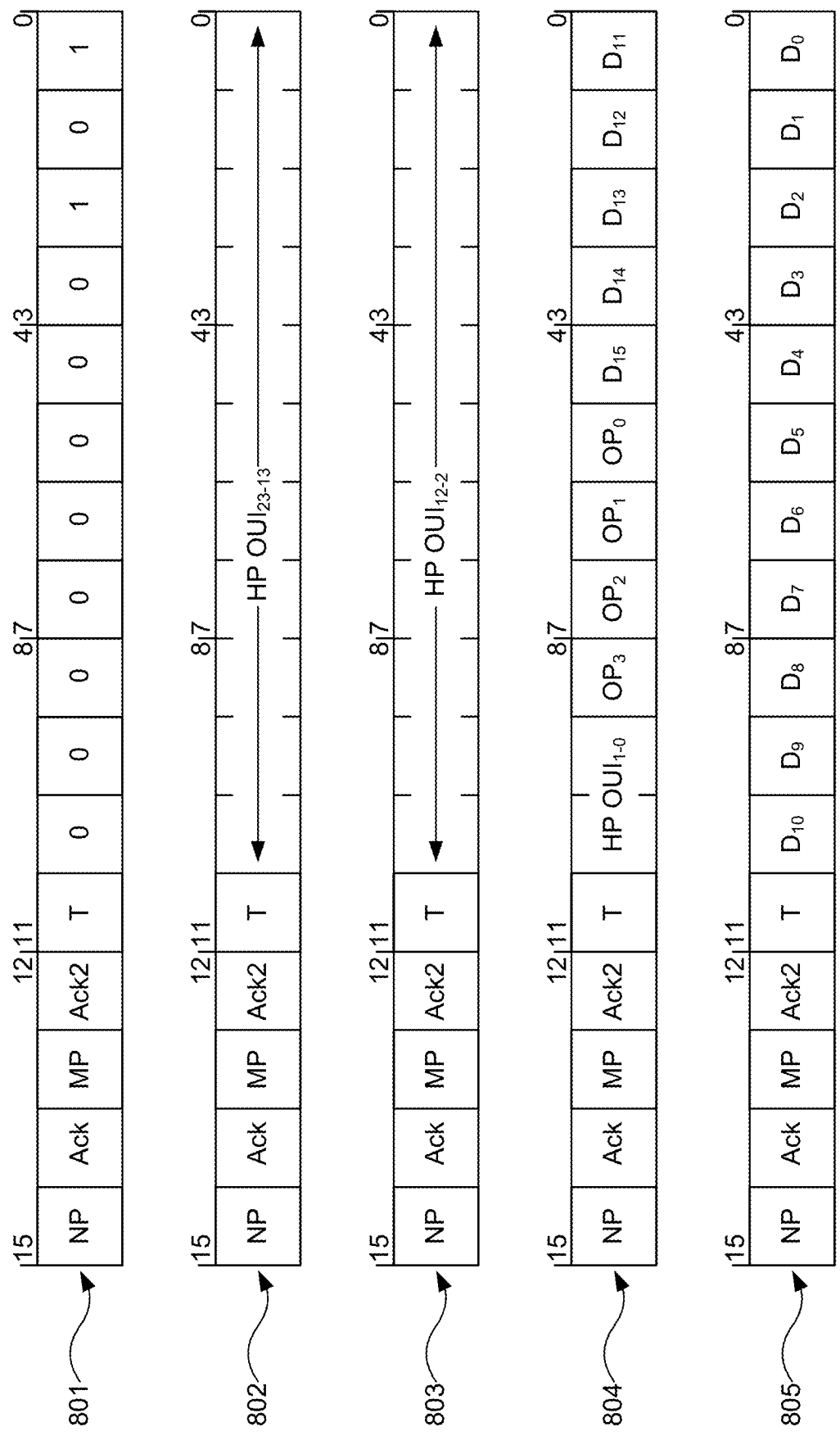
FIG. 9 is a diagram of an organizationally unique identifier (OUI) next page message comprising 20 bits of user-defined code, according to one example of principles described herein.

Since the OUI next page message (800) may also be used for other types of proprietary information exchange, some of the payload bits of the OUI next page message (800) may be reserved for identifying the type of proprietary exchange that is taking place. FIG. 9 is a diagram of an organizationally unique identifier (OUI) next page message comprising 20 bits of user-defined code, according to one example of principles described herein. Bits designated as HP $OUI_{23-0}$ are a 24 bit OUI assigned by the IEEE to Hewlett Packard Company (HP). Bits $OP_{3-0}$ comprise HP defined operation code (Op-Code). Bits $D_{15-0}$ comprise a 16 bit user-defined code value that is specific to the HP Op-Code transmitted. Thus, FIG. 8, using the same bit identifications as in FIG. 8, depicts the assignment of the 20 bits of user defined information. The four most significant bits, $OP_3$ to $OP_0$, are the Op-Code while the remaining 16 bits, D15 through $D_0$, provide information specific to the Op-Code. Tables 1 and 2, below, depict an Op-Code assignment according to one example of principles described herein.

TABLE 1

Example Op-code Assignments

| Op Code | Meaning |
|---|---|
| 0000 | Reserved for future use |
| 0001 | 1-Pair Gigabit Ethernet capability |
| 0010 to 1111 | Reserved for future use |

TABLE 2

Example Op-Code specific data for HP Op-Code "0001"

| Data bit | Meaning |
|---|---|
| $D_0$ | Operate 1 Gb/s Ethernet on pair 1 |
| $D_1$ | Operate 1 Gb/s Ethernet on pair 2 |
| $D_2$ | Operate 1 Gb/s Ethernet on pair 3 |
| $D_3$ | Operate 1 Gb/s Ethernet on pair 4 |
| $D_4$ to $D_{15}$ | Reserved for future use |

In this example, the value "0001," in association with the applicable Hewlett-Packard assigned 24-bit OUI, indicates the capability of operating multiple Ethernet links on a single cable (104, 206, 216, 306). Information specific to the Op-Code in bits $D_{15}$ to $D_1$ are used to convey, at start-up, which of a number of Ethernet links should operate.

The actual exchange may occur as follows. When the auto-negotiation base page exchange is complete, the next page exchange, if supported, may commence. Assuming that the receiving node supports this feature, an OUI next page exchange may commence, and the four next pages may be transferred. Once it is determined that an OUI next page exchange has occurred, the OUI supplied is examined. If the OUI is a known OUI, then the Op-Code field is examined. If the Op-Code indicates the ability to operate multiple Ethernet links on a single cable, and assuming the receiving device is also capable of operating in this mode, the Op-Code specific data is examined to establish which links may operate at start up. In one example, this is based on a logical "OR" of the links that the receiving device and the sending device request.

As mentioned above, the method (400) includes determining (402) a number of Ethernet link types to be configured for the cable based on the on the capabilities and policies of the MACs (108, 308) and PHYs (109, 309) at both ends of the communication link. In one example, determining a communication link type for the cable (104, 206, 216, 306) based on the capabilities and policies of the MACs (108, 308) and PHYs (109, 309) at both ends of the communication link includes determining if the communication link type utilizes central management or a port management.

In one example, central management manages the communication link at a sub-port level by sending specific messages and control messages to the nodes connected to the cable to communicate the desired cable configuration. This allows the nodes (102-1, 102-2, 302) to establish communications through the multiple channels of the cable (104, 206, 216, 306). In keeping with the given example, the multi-channel port (302) management system (316) assigns a number of channels of the multiple possible channels to negotiate the parameters to allow the nodes (102-1, 102-2, 302) to establish communications through the multiple channels of the cable (104, 206, 216, 306).

As mentioned above, the method (400) includes negotiating (403) parameters to allow the nodes (102-1, 102-2, 302) to establish communications through the multiple twisted pairs (212) or wavelengths (λ) of the cable (104, 206, 216, 306) based on the capabilities and policies of the MACs (108, 308) and PHYs (109, 309) at both ends. As will be described below, the managing systems (106, 316) of FIGS. 1, and 3 may renegotiate the parameters according to the number of policies of the managing system.

In one example, the parameters that are negotiated or centrally configured include a link speed parameter. In this example, the link speed parameter allows the node (102-1, 102-2, 302) to communicate with the other node (102-1, 102-2, 302) at a link speed such as 10 Mb/s, 100 Mb/s, 1 Gb/s, 10 Gb/s, 40 Gb/s, or 100 Gb/s via a cable (104, 206, 216, 306). In one example, if a number of twisted pairs (212) or a number of wavelengths (λ) are used to establish communications, the link speeds of each of the twisted pairs (212) or wavelengths (λ) may be negotiated to be 1 Gb/s.

In another example, the parameters may include the number of channels that are used via the cable (104, 206, 216, 306). For example, the parameters may specify to use one channel of the cable (104, 206, 216, 306). In another example, the parameters may specify to use multiple channels of the cable (104, 206, 216, 306). For example, channel one, channel two, and channel four created through use of twisted-pairs 314-1, 314-2, and 314-4, respectively.

As mentioned above, the method (400) includes managing (404), in real-time, the number of twisted-pairs (212) or a number of wavelengths (λ) of the cable (104, 206, 216, 306) based on a number of policies. In one example, managing, in real-time, the twisted-pairs (212) or wavelengths (λ) of the cable based on a number of policies includes powering MACs (108, 308) and PHYs (109, 309) driving the twisted-pairs (212) or wavelengths (λ) of the cable on or off based on the number of policies. For example, the policies may specify that MACs (108, 308) and PHYs (109, 309) that drive twisted-pair (314-1) is powered off while powering the MACs (108, 308) and PHYs (109, 309) that are driving twisted-pairs 314-3 and 314-4. A similar process may take place with a number of wavelengths (λ) within fiber optic cable (FIG. 2A, 216). In another example, the policies may specify that all possible MACs (108, 308) and PHYs (109, 309) that drive either twisted-pairs (212) or wavelengths (λ) are powered on.

In one example, the policies may include a traffic demand policy, a specific time policy, a power conservation policy, a current parameter policy, a change parameter policy, or combinations thereof. The policies will now be described below.

The traffic demand policy may allow drivers of the twisted-pairs (212) or wavelengths (λ) of the cable (104, 206, 216, 306) to power on and off according to a traffic demand. For example, if a traffic demand is high, the traffic demand policy allows the twisted-pairs (212) or wavelengths (λ) of the cable to be driven. For example, all four-twisted pairs of a copper twisted-pair cable (may) may be driven to provide four channels for data transfer. In another example, if a traffic demand is low, the traffic demand policy allows the MACs (108, 308) and PHYs (109, 309) that drive the twisted pairs of the copper twisted-pair cable to power off. For example, the MAC and PHY that drives twisted-pair (314-1) are powered on and the other twisted-pairs are not driven so the associated MACs and PHYs are powered off. As a result, communication through the multiple twisted-pairs may be more energy efficient while maintaining a traffic demand.

The specific time policy may allow the twisted-pairs (212) or wavelengths (λ) of the cable (104, 206, 216, 306) to power on and off during a specific time of day. For example, during the night, very few users may establish communications via the cable. As a result, during the night, multiple twisted pairs (212) or wavelengths (λ) of the cable (104, 206, 216, 306) are not driven according to the specific time policy. For example, the MAC (108, 308) and PHY (109, 309) that drives twisted pair (314-2) may be powered on. Alternatively, during the day, many users establish communications via the cable. As a result, during the day, multiple MACs (108, 308) and PHYs (109, 309) that drive twisted-pairs (212) of the copper twisted-pair cable (104, 206, 306) are powered on according to the specific time policy. For example, all four twisted-pairs may be driven. As a result, communication through the multiple channels may be more energy efficient while maintaining a traffic demand according to the specific time policy.

The power conservation policy may allow the multiple twisted-pairs (212) or wavelengths (λ) of the cable (104, 206, 216, 306) to driven or not according to power conservation goals. For example, if a power conservation policy specifies that power is to be conserved at all times, a maximum of two-twisted pairs may be driven at any given time. Alternatively, if a power conservation policy specifies that power is not to be conserved at all times, all of the twisted-pairs may be driven at any given time. As a result, communication through the multiple channels may be more energy efficient according to the power conservation policy.

The current parameter policy may allow the MACs (108, 308) and PHYs (109, 309) that drive multiple twisted-pairs (212) or wavelengths (λ) of the cable (104, 206, 216, 306) to power on and off according to the current parameters. For example, the current parameter may specify that two twisted-pairs (212) are to be driven at the current period of time. In another example, the current parameter may specify that all twisted-pairs (212) are to be driven at the current period of time.

The change parameter policy may allow the multiple MACs (108, 308) and PHYs (109, 309) that drive the twisted-pairs (212) or wavelengths (λ) of the cable (104, 206, 216, 306) to power on and off according to change parameters. For example, the change parameter may specify that two twisted-pairs are to be utilized at a given future period of time. In another example, the change parameter may specify that all twisted-pairs are to be utilized at a given future period of time. As a result, the change parameter policy allows the managing system to change the current parameters.

Figure 5:
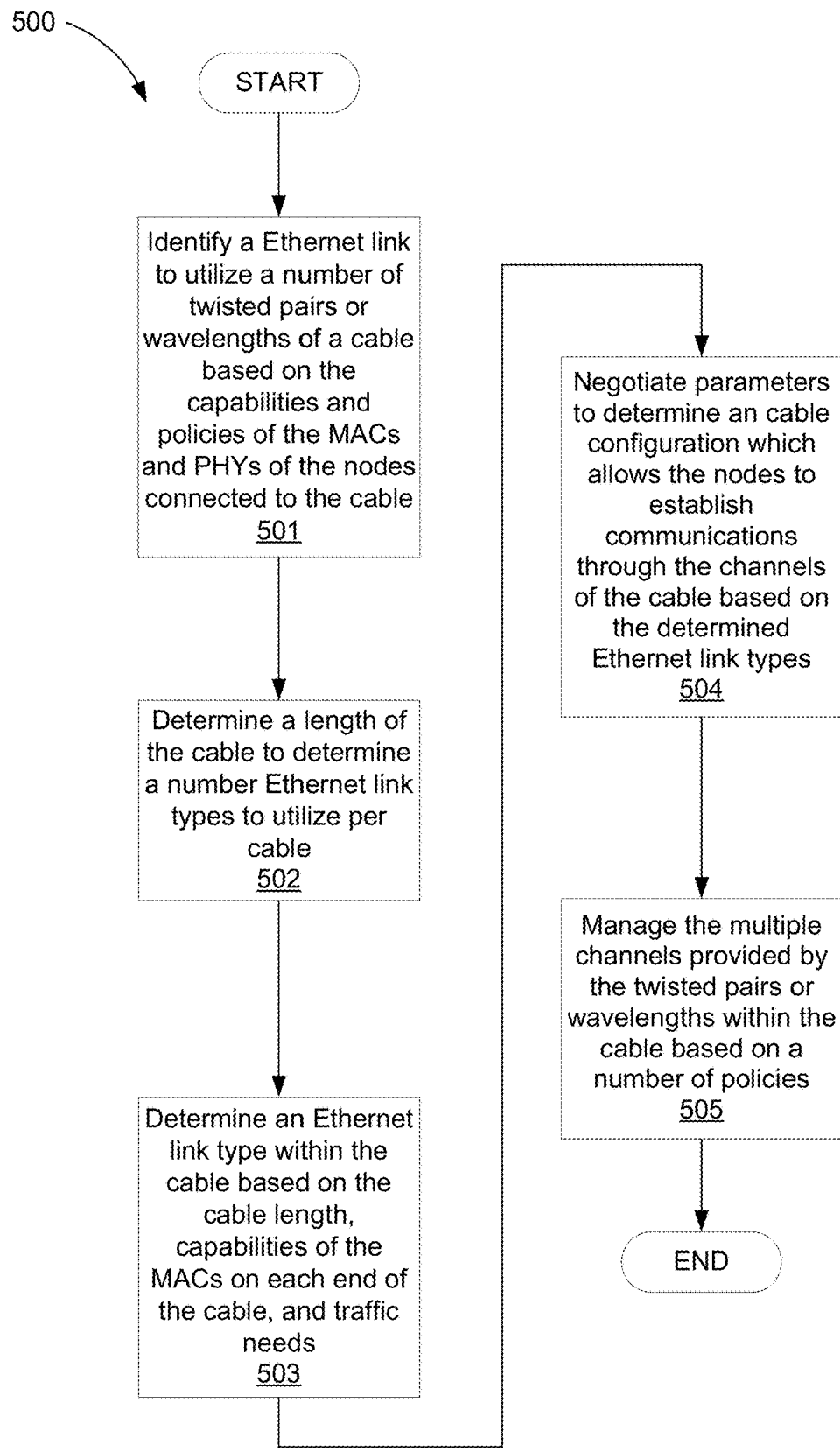
FIG. 5 is a flowchart of a method for managing multiple Ethernet links on a cable, according to one example of principles described herein.

FIG. 5 is a flowchart of an example of a method for managing multiple Ethernet links on a cable (104, 206, 216, 306), according to one example of principles described herein. In one example, the method (500) may be executed by the system (300) of FIG. 3. In other examples, the method (500) may be executed by other systems described herein such as, for example, the system (100) of FIG. 1, the system (200) of FIG. 2, the system (250) of FIG. 2A, managing system (600) of FIG. 6 described below, memory resources (700) of FIG. 7 also described below, or combinations thereof. In one example, the method (500) includes identifying (501) an Ethernet link to utilize a number of twisted-pairs or wavelengths of a cable based on the capabilities and policies of the MACs (108, 308) and PHYs (109, 309) of the nodes (102, 302) connected to the cable (104, 206, 216, 306). The method further determines (502) a length of the cable to determine the Ethernet link types to utilize per cable to allow the nodes to establish communications. The method (500) may further comprise determining (503) an Ethernet link type within the cable based on the cable length, capabilities of the MACs and PHYs on each end of the cable, and traffic needs. The method further negotiates (504) parameters to determine a cable configuration which allows the nodes to establish communications through the channels such as, for example twisted-pairs or wavelengths of the cable based on the determined Ethernet link type(s), and managing (505), in real-time, the multiple channels provided by the twisted pairs or wavelengths within the cable based on a number of policies.

As mentioned above, the method (500) includes determining (502) a length of the cable to determine the Ethernet link types and number of MACs to utilize multiple channels to allow the nodes to establish communications. Thus, block 502 is used to determine a length of the cable to determine the types and number of channels to allocate to allow the nodes to establish communications. In one example, the length of the cable is used to help determine the allocation of the four channels in the copper twisted-pair cable (206). If the length of the cable is greater than a certain length, more twisted-pairs (212) may be utilized at slower speeds to create two to four channels. In keeping with the given example, if the length of the cable (206) is less than a certain length, a higher speed single channel, utilizing multiple twisted-pairs (212), may be utilized to create one high speed channel.

In another example, the length of a fiber cable (216) may influence the type of wavelength grouping and type of optical transmitters and receivers selected and/or configured to create channels. Further, the length of a fiber cable (216) may influence how to allocate those channels to a number of MACs (108, 308).

In another example, depending on the length of the cables, if a single high speed communication link is desired; multiple cables may be utilized. For example, the single high speed communication link may utilize five cables. In this example, all four twisted pairs of each of the five cables may be linked together to create a single high speed communication link.

Figure 6:
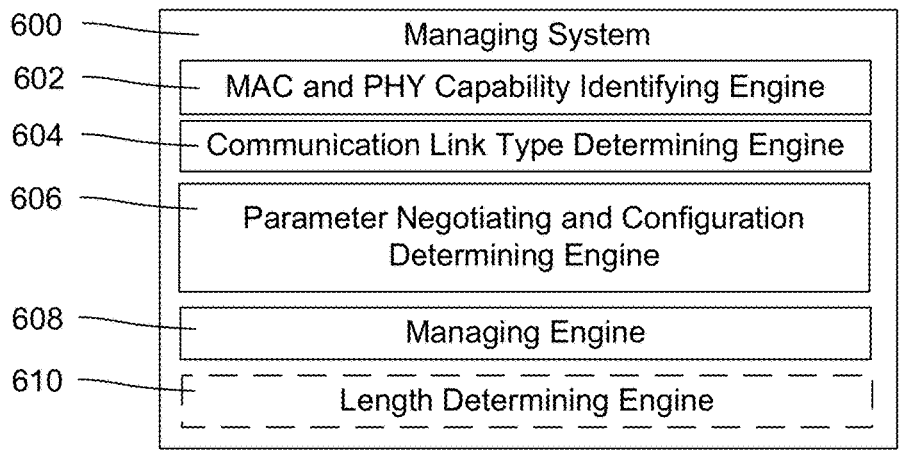
FIG. 6 is a diagram of a managing system, according to one example of principles described herein.

FIG. 6 is a diagram of an example of a managing system (106-1, 106-2, 106-3, 316), according to one example of principles described herein. The managing system (600) includes a MAC (108, 308) and PHY (109, 309) capability identifying engine (602), an Ethernet link type determining engine (604), a parameter negotiating and configuration determining engine (606), and a managing engine (608). In one example, the managing system (600) may also include a length determining engine (610). In one example, the engines (602, 604, 606, 608, 610) refer to a combination of hardware and program instructions to perform a designated function. In this example, each of the engines (602, 604, 606, 608, 610) may include a processor and memory. The program instructions are stored in the memory and cause the processor to execute the designated function of the engine.

In another example utilizing port management, the engines (602, 604, 606, 608, 610) may be implemented as logic stored on a data storage device. In still another example, state machines that do not contain a processor such as, for example, a number of application specific integrated circuits (ASICs). In this example, the functionality of the MACs (108, 308) and PHYs (109, 309) described herein may also be implemented by these ASICs.

The MAC and PHY capability identifying engine (602) identifies the capabilities of the MACs (108, 308) and PHYs (109, 309) on each end of the cable (104, 206, 216, 306). The capabilities describe how each MAC (108, 308) and PHY (109, 309) can utilize the number of twisted-pairs (212) or wavelengths (A), and at what speed. In one example, the MAC and PHY capability identifying engine (602) identifies whether MACs (108, 308) and PHYs (109, 309) at each end of the cable can utilize multiple twisted-pairs (212) or wavelengths (λ) of a cable (104, 206, 216, 306). In another example, the MAC and PHY capability identifying engine (602) identifies whether the nodes (102, 302) at either end of the cable (104, 206, 216, 306) can utilize multiple twisted-pairs (212) or wavelengths (λ) of multiple cables (104, 206, 216, 306) to form a single channel or multiple aggregated channels.

The Ethernet link type determining engine (604) determines a number of communication link types for the cable (104, 206, 216, 306) which may reside at either end of the cable or may be centralized. In one example, the Ethernet link type determining engine (604) determines if a number of the Ethernet link types has central management or has port management.

The parameter negotiating and configuration determining engine (606) negotiates parameters to allow the nodes to establish communications through the multiple twisted-pairs (212) or wavelengths (λ) of the cable (104, 206, 216, 306) based on the capabilities and policies of the MACs (108, 308) and PHYs (109, 309) at both ends of the cable. The parameter negotiating and configuration determining engine (606) further determines the desired cable configuration that describes the negotiated parameters. In one example, the parameter negotiating and configuration determining engine (606) negotiates a link speed parameter as well as the other parameters described above, and constructs a desired cable configuration data element containing these parameters.

The managing engine (608) manages the multiple twisted-pairs (212) or wavelengths (λ) of the cable (104, 206, 216, 306) based on a number of policies. In one example, the managing engine (608) manages the multiple twisted-pairs (212) or wavelengths (λ) of the cable (104, 206, 216, 306) in real time. In another example, the managing engine (608) manages the powering of the MACs (108, 308) and PHYs (109, 309) that drive the multiple twisted-pairs (212) or wavelengths (λ) of the cable, on or off based on the number of policies. As mentioned above, the number of policies may include a traffic demand policy, a specific time policy, a power conservation policy, a current parameter policy, a change parameter policy, other policies, or combinations thereof.

The length determining engine (610) determines a length of the cable (104, 206, 216, 306) to determine the number of multiple channels to allocate to allow the nodes to establish communications. In one example, the length determining engine (610) determines a length of one cable. In another example, the length determining engine (610) determines a length of the multiple cables. In one example, the length determining engine (610) determines a length of a fiber cable (216). In another example, the length determining engine (610) determines a length of a cable (206).

Figure 7:
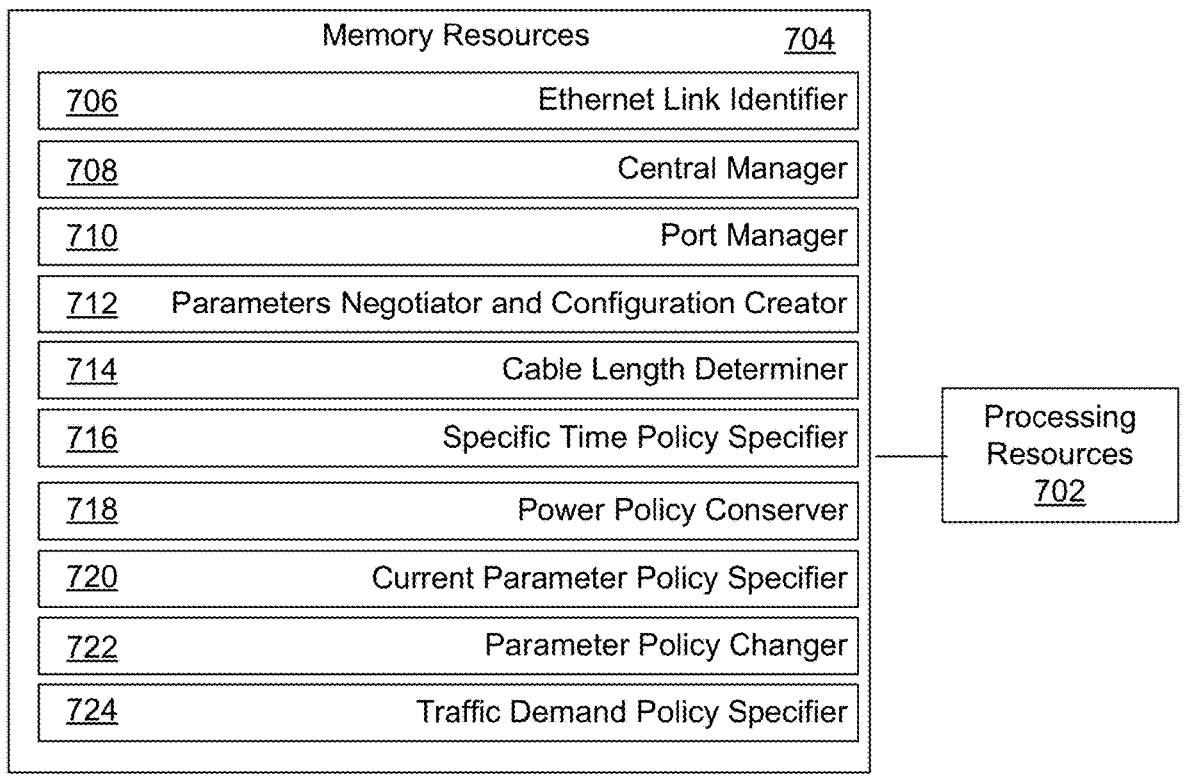
FIG. 7 is a diagram of a managing system, according to one example of principles described herein.

FIG. 7 is a diagram of an example of a managing system (106-1, 106-2, 106-3, 316), according to one example of principles described herein. In this example, managing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the managing system (700). The programmed instructions shown stored in the memory resources (704) include an Ethernet link identifier (706), a central manager (708), a port manager (710), a parameters negotiator and configuration creator (712), a cable length determiner (714), a specific time policy specifier (716), a power policy conserver (718), a current parameter policy specifier (720), a parameter policy changer (722), and a traffic demand policy specifier (724).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The Ethernet link identifier (706) represents programmed instructions that, when executed, cause the processing resources (702) to identify an Ethernet link to utilize multiple twisted pairs (212) or wavelengths (λ) of a cable (104, 206, 216, 306) based on nodes (102, 302) connected to the cable. The central manager (708) represents programmed instructions that, when executed, cause the processing resources (702) to manage the communication link at a sub-multi-port (MAC) level by sending specific messages and control messages with the desired cable configuration data to the nodes connected to both ends of the cable containing the negotiated parameters, to allow the nodes to establish communications through the one or multiple twisted-pairs (212) or wavelengths (λ) of the cable (104, 206, 216, 306). The MAC manager (710) represents programmed instructions that, when executed, cause the processing resources (702) to manage the assignment of one channel of the multiple channels to negotiate the parameters to allow the nodes to establish communications through the one or multiple twisted-pairs or wavelengths of the cable.

The parameters negotiator and configuration creator (712) represents programmed instructions that, when executed, cause the processing resources (702) to negotiate parameters and create a configuration to allow the nodes (102, 302) to establish communications through the multiple twisted-pairs or (212) wavelengths (λ) of the cable (104, 206, 216, 306) based on the selected Ethernet link type. The cable length determiner (714) represents programmed instructions that, when executed, cause the processing resources (702) to determine a length of the cable to determine the number of multiple channels to allocate to allow the nodes to establish communications.

The specific time policy specifier (716) represents programmed instructions that, when executed, cause the processing resources (702) to specify a time to manage, in real-time, the multiple twisted-pairs (212) or wavelengths (λ) of the cable (104, 206, 216, 306) according to a specific time policy. The power policy conserver (718) represents programmed instructions that, when executed, cause the processing resources (702) to conserve power by managing, in real-time, the MACs (108, 308) and PHYs (109, 309) that drive the multiple twisted-pairs or wavelengths of the cable according to a power conservation policy. The current parameter policy specifier (720) represents programmed instructions that, when executed, cause the processing resources (702) to specify current parameters to manage, in real-time, the MACs (108, 308) and PHYs (109, 309) that drive the multiple twisted-pairs (212) or wavelengths (λ) of the cable according to a current parameter policy.

The parameter policy changer (722) represents programmed instructions that, when executed, cause the processing resources (702) to change parameters, in real-time. The new parameters are used to create new desired cable configurations that specify how to utilize the multiple twisted-pairs (212) or wavelengths (λ) within the cable (104, 206, 216, 306) according to a change parameter policy. The traffic demand policy specifier (724) represents programmed instructions that, when executed, cause the processing resources (702) to manage, in real-time, the multiple twisted-pairs or wavelengths of the cable according to a traffic demand policy.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources may include integrated memory such as a hard drive, a solid state hard drive, or the like.

In some examples, the processing resources (702) and the memory resources (702) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the managing system (700) may be implemented on a user device, on a server, on a collection of servers, or combinations thereof.

The managing system (700) of FIG. 7 may be part of a general purpose computer. However, in alternative examples, the managing system (700) is part of an application specific integrated circuit.

Aspects of the present systems and methods are described herein with reference to flowchart illustrations and/or block diagrams of methods, apparatus (systems), and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processors of a number of computing devices described herein such as, for example, node one (102-1) and node two (102-2), the managing system (106, 316)), the TCOP (304), the multi-channel port (302) other programmable data processing apparatus, or combinations thereof, implement the functions or acts specified in the flowchart and/or block diagram block or blocks. In one example, the computer usable program code may be embodied within a computer readable storage medium; the computer readable storage medium being part of the computer program product. A computer readable storage medium is distinguished herein apart from a computer readable signal medium, the latter not being a physical, tangible, or non-transitory medium. Thus, in one example, the computer readable storage medium is a non-transitory computer readable medium.

The specification and figures describe methods and systems for managing multiple channels of a cable. The systems and methods include identifying a number of Ethernet links to utilize a number of channels of a cable based on a number of capabilities and a number of policies of a number of media access controllers (MACs) and a number of physical layer entities (PHYs), determining a number of Ethernet link types to be configured for the cable based on the capabilities and policies of the MACs and PHYs, negotiating a number of parameters to allow multi-channel ports of a number of nodes connected to the cable to establish communications through the Ethernet links based on the determined Ethernet link types and the utilized channels, and managing, in real-time, the cable configuration describing the MACs to be supported by the channels within the cable based on the policies. These methods and systems for managing multiple channels of a cable may have a number of advantages, including provision of a communications through a number of channels within a cable that are more energy efficient and maintain a traffic demand The preceding description has been presented to illustrate and describe examples of the principles described. This description is not intended to be exhaustive or to limit these principles to any precise form disclosed. Many modifications and variations are possible in light of the above teaching.

What is claimed is:

1. A method for managing multiple Ethernet links on a single cable comprising:
   identifying the multiple Ethernet links on the single cable based on capabilities and policies of media access controllers (MACs) and physical layer entities (PHYs), wherein each Ethernet link of the multiple Ethernet links utilizes one or more channels of the single cable;
   determining Ethernet link types to be configured for the single cable based on the capabilities and the policies of the MACs and the PHYs;
   for each of the multiple Ethernet links, negotiating parameters based on a corresponding determined Ethernet link type and the one or more channels utilized by a respective Ethernet link, wherein negotiating the parameters comprises exchanging capabilities between two nodes connected to the single cable using at least one or more next page messages, wherein the at least one or more next page messages comprise an Organizationally Unique Identifier (OUI), an operation code indicating whether a node is capable of operating multiple Ethernet links on the single cable, and one or more user-defined codes specific to the operation code; and managing, in real time, the multiple Ethernet links within the single cable based on the policies, wherein managing the respective Ethernet link comprises powering off one or more MACs and PHYs corresponding to a particular channel based at least on traffic demand.

2. The method of claim 1, in which managing the respective Ethernet link comprises powering the one or more channels of the single cable on or off based on the policies.

3. The method of claim 2, in which the policies comprise a traffic demand policy, a specific time policy, a power conservation policy, a current parameter policy, a change parameter policy, or combinations thereof.

4. The method of claim 1, further comprising determining a length of the single cable to determine the Ethernet link types to utilize per cable to allow the two nodes to establish communications.

5. The method of claim 1, in which determining the corresponding Ethernet link type comprises determining if the corresponding Ethernet link type is a central management or a port management.

6. The method of claim 5, in which the central management manages the respective Ethernet link at a sub-port level by sending specific messages and control messages to the two nodes to negotiate the parameters, in which negotiating the parameters comprises finding a best match of a set of parameters of each end of the single cable.

7. The method of claim 5, in which the port management assigns one channel to negotiate the parameters.

8. The method of claim 1, in which the method is performed by a central managing device separate from the two nodes, in which the central managing device sends configuration data to both of the two nodes based on the identified multiple Ethernet links to utilize, the determined Ethernet link types, and the negotiated parameters to configure both ends of the single cable.

9. A system for managing multiple Ethernet links on a single cable comprising:
a processor;
a storage device coupled to the processor and storing instructions that when executed by the processor cause the processor to perform a method, the method comprising:
identifying the multiple Ethernet links on the single cable based on capabilities and policies of media access controllers (MACs) and a physical layer entities (PHYs), wherein each Ethernet link of the multiple Ethernet links utilizes one or more channels of the single cable;
determining Ethernet link types for the single cable based on the capabilities and the policies of the MACs and the PHYs;
for each of the multiple Ethernet links, negotiating parameters based on a corresponding determined Ethernet link type and the one or more channels utilized by a respective Ethernet link, wherein negotiating the parameters comprises exchanging capabilities between two nodes connected to the cable using at least one or more next page messages, wherein the at least one or more next page messages comprise an Organizationally Unique Identifier (OUI), an operation code indicating whether a node is capable of operating multiple Ethernet links on the single cable, and one or more user-defined codes specific to the operation code; and managing, in real time, the multiple Ethernet links within the single cable based on the policies, wherein managing the respective Ethernet link comprises powering off one or more MACs and PHYs corresponding to a particular channel based at least on traffic demand.

10. The system of claim 9, wherein the policies comprise a traffic demand policy, a specific time policy, a power conservation policy, a current parameter policy, a change parameter policy, or combinations thereof.

11. The system of claim 9, wherein determining the corresponding Ethernet link type comprises determining if the corresponding Ethernet link type is a central management or a port management.

12. The system of claim 11, in which the central management manages the respective Ethernet link at a sub-port level by sending specific messages and control messages to the two nodes connected to the ends of the single cable to negotiate the parameters, in which negotiating the parameters comprises finding a best match of a set of parameters of each end of the single cable.

13. The system of claim 11, in which the port management assigns one channel of the one or more channels to negotiate the parameters.

14. The system of claim 9, wherein the method comprises determining a length of the single cable to determine the Ethernet link types to utilize per cable to allow the two nodes to establish communications.

15. A computer program product for managing multiple Ethernet links of a single cable, comprising:
a non-transitory computer readable storage medium, said non-transitory computer readable storage medium comprising computer readable program code embodied therewith, said computer readable program code comprising program instructions that, when executed, causes a processor to:
identify the multiple Ethernet links on the single cable based on capabilities and policies of media access controllers (MACs) and physical layer entities (PHYs) connected to the single cable, wherein each Ethernet link of the multiple Ethernet links utilizes one or more channels of the single cable;
determine Ethernet link types for the single cable based on the capabilities and the policies of the MACs and the PHYs;
for each of the multiple Ethernet links, negotiate parameters based on a corresponding determined Ethernet link type and the one or more channels utilized by a respective Ethernet link, wherein negotiating the parameters comprises exchanging capabilities between two nodes connected to the single cable using at least one or more next page messages, wherein the at least one or more next page messages comprise an Organizationally Unique Identifier (OUI), an operation code indicating whether a node is capable of operating multiple Ethernet links on the single cable, and one or more user-defined codes specific to the operation code; and
manage, in real time, the multiple Ethernet links within the single cable based on the policies, wherein managing the respective Ethernet link comprises powering off one or more MACs and PHYs corresponding to a particular channel based at least on traffic demand.

16. The product of claim 15, further comprising computer readable program code comprising program instructions that, when executed, cause said processor to determine a length of the single cable to determine the MACs to utilize per Ethernet link to allow the two nodes to establish communications.

* * * * *